US012272183B2

(12) United States Patent
Neely et al.

(10) Patent No.: US 12,272,183 B2
(45) Date of Patent: Apr. 8, 2025

(54) MOTOR VEHICLE WITH CONTROL SYSTEM OPERABLE FOR TRANSFERRING IN-VEHICLE VOICE CALLS TO AN EXTERNAL MOBILE DEVICE

(71) Applicant: GM GLOBAL TECHNOLOGY OPERATIONS LLC, Detroit, MI (US)

(72) Inventors: Matthew Neely, Rochester, MI (US); Matthew E. Gilbert-Eyres, Rochester, MI (US); Eric T. Hosey, Royal Oak, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 513 days.

(21) Appl. No.: 17/691,239

(22) Filed: Mar. 10, 2022

(65) Prior Publication Data
US 2023/0290188 A1 Sep. 14, 2023

(51) Int. Cl.
*G07C 5/00* (2006.01)
*G07C 5/08* (2006.01)
*H04M 7/00* (2006.01)

(52) U.S. Cl.
CPC .......... *G07C 5/008* (2013.01); *G07C 5/0816* (2013.01); *H04M 7/0024* (2013.01)

(58) Field of Classification Search
CPC .... G07C 5/008; G07C 5/0816; H04M 7/0024
See application file for complete search history.

(56) References Cited

U.S. PATENT DOCUMENTS

| 11,050,980 | B2 | 6/2021 | Murata et al. | |
|---|---|---|---|---|
| 2011/0306329 | A1* | 12/2011 | Das | H04W 4/90 455/416 |
| 2013/0337801 | A1* | 12/2013 | Yi | H04W 80/10 455/426.1 |
| 2014/0273859 | A1* | 9/2014 | Luna | H04M 1/72454 455/41.3 |
| 2015/0163832 | A1* | 6/2015 | Hosey | H04W 4/029 455/404.2 |
| 2017/0353904 | A1* | 12/2017 | Kim | H04B 17/318 |
| 2020/0198658 | A1* | 6/2020 | Suzuki | B60W 60/0013 |
| 2021/0091575 | A1 | 3/2021 | Li et al. | |
| 2022/0167139 | A1* | 5/2022 | Dodman | H04M 1/72421 |

* cited by examiner

*Primary Examiner* — Rasha S Al Aubaidi
(74) *Attorney, Agent, or Firm* — Quinn IP Law

(57) ABSTRACT

A method for use aboard a motor vehicle having a vehicle interior and a vehicle telematics unit (VTU) includes detecting, using an electronic control unit (ECU), an active voice call between the VTU and a remote call center, and processing sensor data via the ECU. The sensor data is indicative of an operator of the vehicle having exited the interior. In response to enabling conditions, the voice call is transferred to a personal mobile device, e.g., a smartphone, external to the interior. The enabling conditions may include receipt by the ECU of a call transfer approval signal. A motor vehicle includes a body and control system attached thereto. The control system includes the VTU, a sensor suite, and the ECU. A computer-readable storage medium includes instructions, the execution of which by a processor of the ECU causes the method to be performed.

20 Claims, 3 Drawing Sheets

MOTOR VEHICLE WITH CONTROL SYSTEM OPERABLE FOR TRANSFERRING IN-VEHICLE VOICE CALLS TO AN EXTERNAL MOBILE DEVICE

INTRODUCTION

Motor vehicles are commonly equipped with a vehicle telematics unit (VTU) operable for collecting and reporting a wide variety of vehicle information. In a typical setup, global positioning system (GPS) receivers, onboard diagnostic systems, wireless transceivers, and a myriad of sensors are used to detect, record, and wirelessly communicate the relevant vehicle information to various consumers of the information, including the operator, the vehicle manufacturer, maintenance facilities, and other service providers. The collective set of vehicle information may be used in the performance of real-time onboard and offline system diagnostics, as well as to initiate corrective actions as needed.

VTU-equipped motor vehicles may also be configured to support emergency and non-emergency response functions via remote communication with a remote call center. A vehicle-to-call center telephonic connection may be automatically established by operation of the VTU in the event of a detected accident, breakdown, component failure, or other vehicle event, or in response to an operator-initiated service call. In response to an automatically-initiated or operator-initiated call, the VTU would typically contact the call center using the vehicle's built-in telecommunications circuitry, with the remote call center thereafter responding in an appropriate manner, such as by requesting assistance from police, fire, emergency medical technicians (EMTs), or other first responders, or by scheduling roadside assistance in the form, e.g., of a tow truck, fuel delivery service, or flat tire repair. Using the established vehicle-to-call center telephonic connection, a call center operator would typically maintain an ongoing conversation with the operator or other passenger/customer until assistance arrives on site, or until the operator signals that roadside assistance is no longer required.

SUMMARY

Disclosed herein are methods and hardware systems for situationally offloading an active voice call, i.e., an established cellular or satellite-based telephonic voice call, between an operator of a motor vehicle and a third party provider, with the third party provider represented herein as a call center and one or more advisers or agents thereof. The present communications control strategy enables the operator, during an emergency or non-emergency event of the various types contemplated herein, to transmit audio signals through a personal mobile device such as a smartphone, tablet computer, laptop computer, or wearable device. As noted above, an adviser working in the employ of a remote call center, e.g., an OnStar® call center, generally requires the operator to remain engaged in conversation with the adviser through the vehicle's telecommunications system, which in turn requires that the operator remain seated within the vehicle's interior in proximity to the microphones arranged therein. However, many roadside situations require the operator to exit the vehicle, e.g., for the operator's physical wellbeing or to assist a bystander. The present solutions therefore allow the operator to quickly and seamlessly transfer an ongoing active voice call to the operator's mobile device, such as through a Bluetooth®, Wi-Fi, near-field communication (NFC) link, or an available software application ("app"), e.g., the OnStar Guardian™ app, thereby allowing the operator to continue the conversation with the adviser while outside of the vehicle. Transferring within the scope of the disclosure does not necessarily entail terminating the in-vehicle conversation, as embodiments disclosed herein allow for simultaneous connection or "conferencing" of multiple persons, one or more of whom are located within the vehicle interior while the transferred call is handled via the mobile device.

An aspect of the subject disclosure includes an automated method for use aboard a motor vehicle having a vehicle interior, a VTU, and an electronic control unit (ECU). The method according to a possible embodiment includes detecting, using the ECU, an active voice call between the VTU and a remote call center. The method also includes processing sensor data via the ECU, with the sensor data being indicative of an operator of the motor vehicle having exited the vehicle interior. In response to one or more enabling conditions, the active voice call is transferred to a mobile device that is located external to/outside of the vehicle interior, with the mobile device in a representative embodiment being a smartphone in possession of the operator or other passenger/customer that might be party to the voice call.

The enabling conditions include receipt by the ECU of a call transfer approval signal. In a possible embodiment, the call transfer approval signal includes a prerecorded approval setting in memory of or otherwise accessible by the ECU, such that the active voice call is automatically transferred to the mobile device when the mobile device is outside of the vehicle interior, with alternative manual confirmation strategies contemplated herein in other embodiments.

The method in one or more optional embodiments includes transmitting a digital image or other prompt to the mobile device for display on a screen thereof, and then using an affirmative reply to the prompt as the call transfer approval or signal indicative thereof. For instance, transmitting the prompt may include transmitting a digital image or icon to the mobile device for display on a touchscreen thereof.

Processing the sensor data in at least some implementations includes processing an electronic signal indicative of a present location of the mobile device, and comparing the present location of the mobile device to a present location of the motor vehicle. The mobile device may include a global positioning system (GPS) receiver or chipset operable for determining a GPS position of the mobile device. In such a case, the electronic signal indicative of the present location of the mobile device includes the GPS position of the mobile device.

The motor vehicle may include one or more audio speakers situated within the vehicle interior, in which case the method further includes simultaneously broadcasting ("simulcasting") the active voice call into the vehicle interior over the audio speaker(s) concurrently with transferring the active voice call to the mobile device. In such a scenario, the active voice call is simultaneously audible on the audio speaker and the mobile device over concurrent communications channels, thus enabling a conference calling option in which the call center may communicate simultaneously with the operator and passengers possibly remaining within the vehicle interior.

Processing the sensor data may also include detecting unpairing or disconnection of a wired or wireless connection of the mobile device and the VTU, e.g., a USB, Bluetooth®, NFC, or Wi-Fi connection. Processing the sensor data may include processing one or more occupancy signals indicative of a presence of the operator within the vehicle interior, such as but not limited to a seatbelt latch state signal, a door open/closed state signal, or a weight, infrared, and/or motion signal, etc.

Transferring the active voice call to the mobile device may include initiating, via the ECU, a cellular phone connection between the remote call center and the mobile device in some embodiments, either with or without terminating the in-vehicle channel of the active voice call as noted above.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
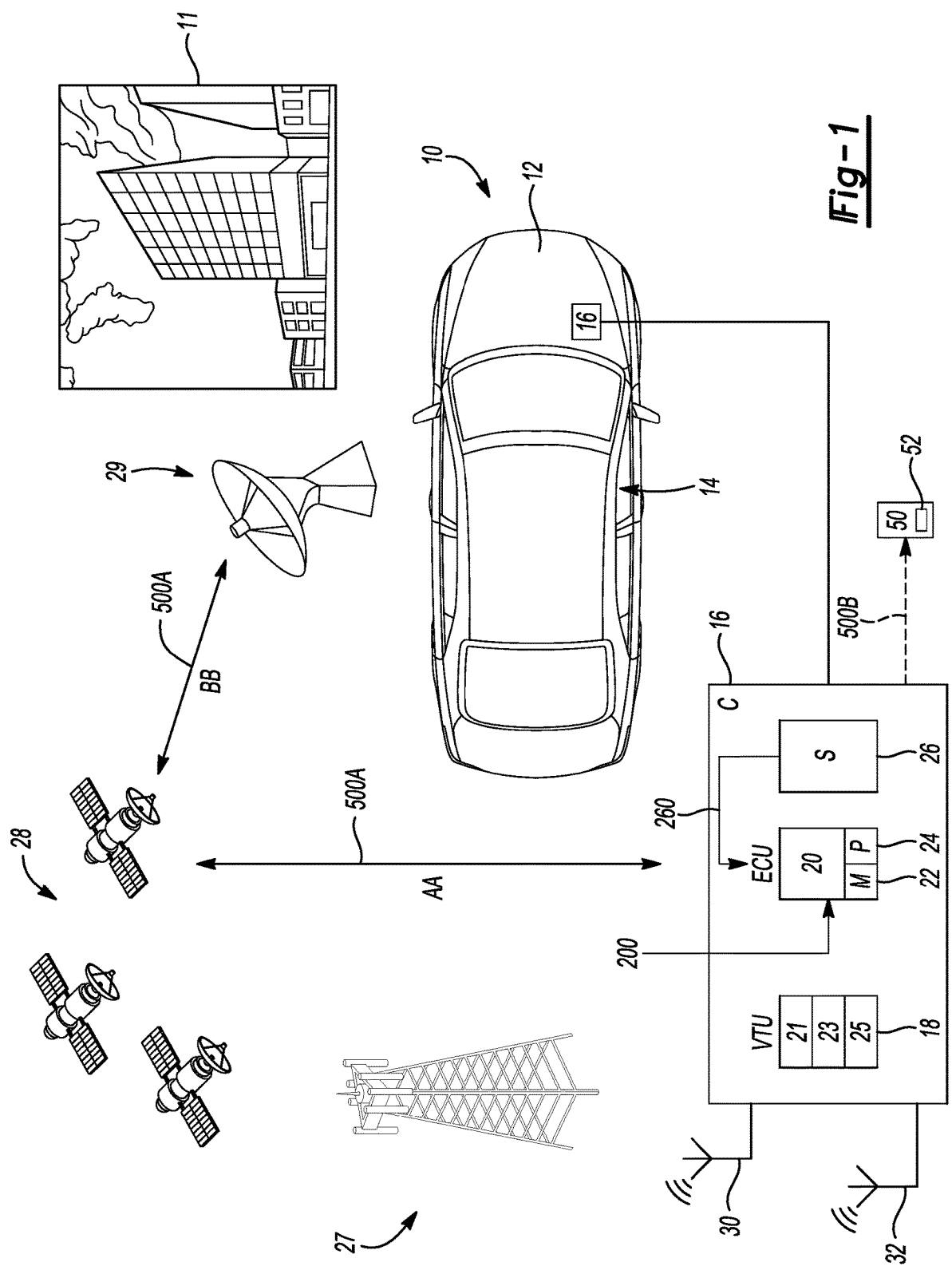
FIG. 1 is a schematic illustration of a motor vehicle having an electronic control unit (ECU) configured for situationally offloading or transferring an active voice call from an onboard vehicle telematics unit (VTU) to a cell phone or another mobile device located outside of the motor vehicle.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 2:
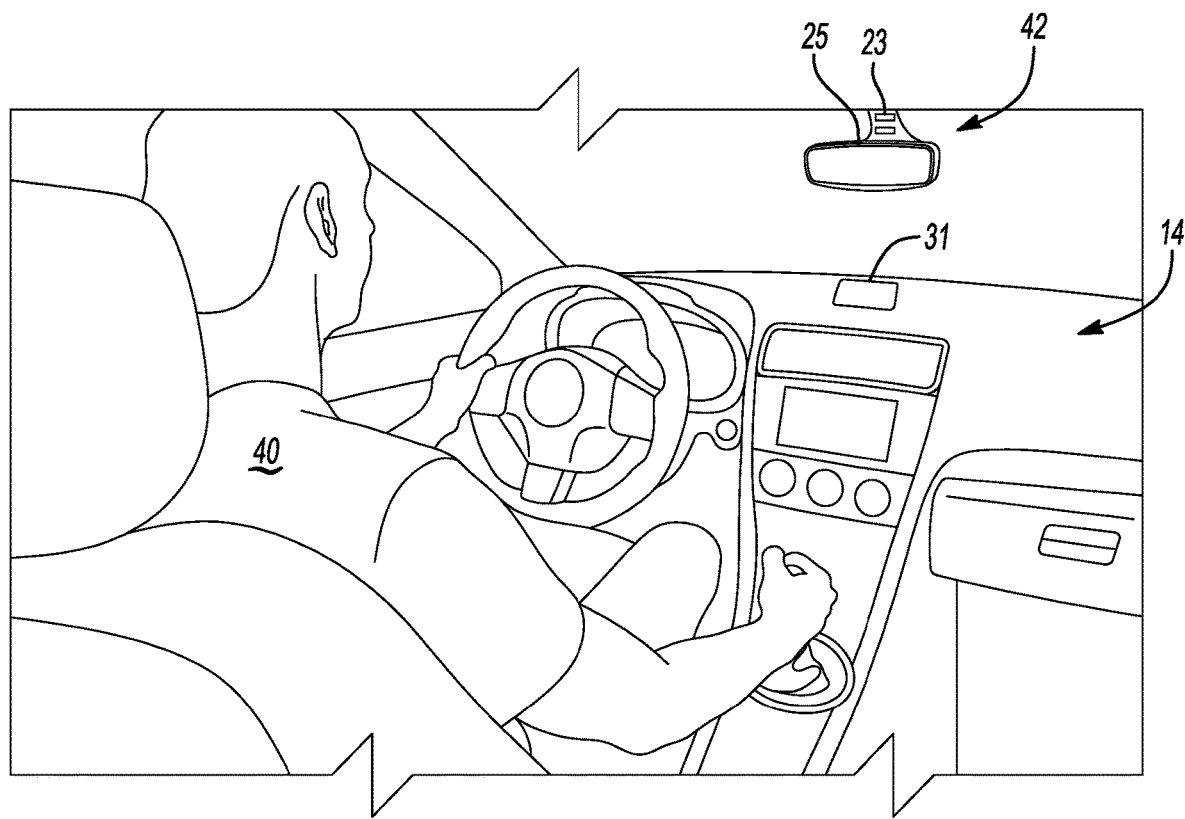
FIGS. 2 and 3 illustrate voice call scenarios occurring respectively inside of and outside of a vehicle interior of the motor vehicle shown in FIG. 1.

Referring to the drawings, wherein like reference numbers refer to like features throughout the several views, FIG. 1 depicts a motor vehicle 10 having a vehicle body 12 defining a vehicle interior 14. As part of its overall programmed functionality, the motor vehicle 10 may at times be placed in communication with a remote call center 11, e.g., an OnStar® call center. Such a call center 11 may provide roadside assistance services automatically or in response to a request, e.g., from an operator 40 seated within the vehicle interior 14 as shown in FIG. 2. In a typical use scenario, for instance, the call center 11 of FIG. 1 might be automatically notified of an accident, breakdown, flat tire, powertrain or vehicle system problem, or another status of the motor vehicle 10, with the call center 11 initiating an active voice call 500A in response to the automatic notification. Alternatively, the operator 40 of FIGS. 2 and 3 may initiate the active voice call 500A by pressing a call button 25 located, e.g., on a rearview mirror assembly 42 (see FIG. 2) or another suitable location within the vehicle interior 14.

Figure 3:
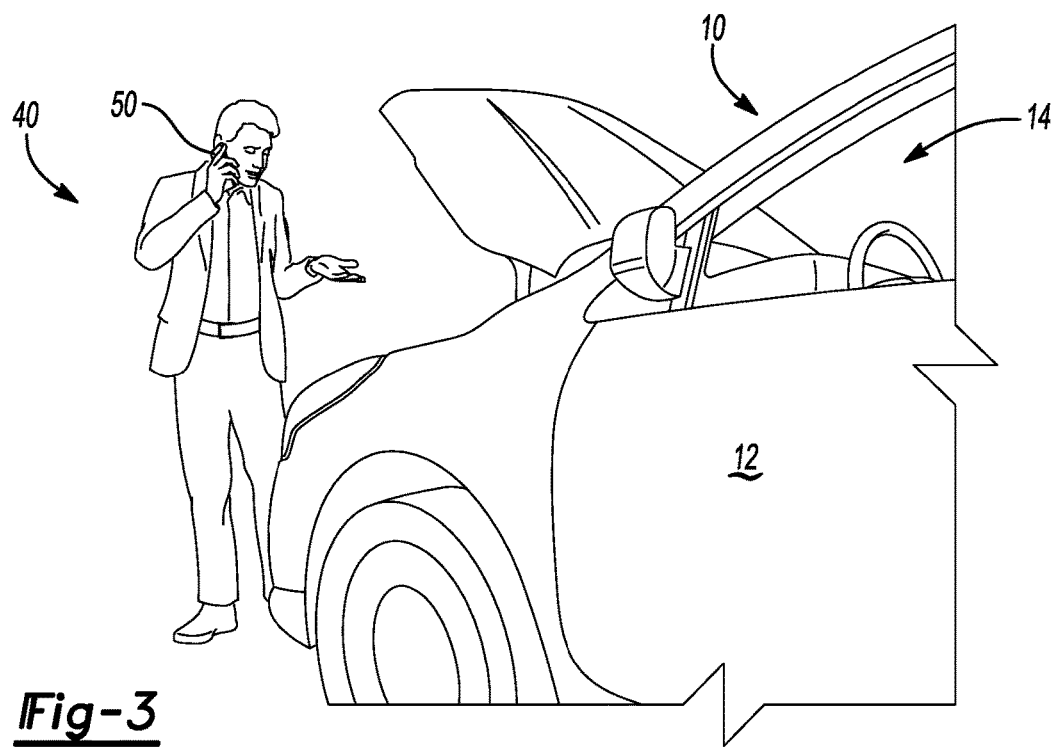

As noted above, at times the operator 40 of FIGS. 2 and 3 may be required to exit the vehicle interior 14 during a roadside event. The present teachings are directed toward maintaining the previously established active voice call 500A when this occurs, specifically by transferring the active voice call 500A to a mobile device 50 as shown in FIG. 3. Such a transfer may occur without terminating the in-vehicle call, which allows a passenger remaining within the vehicle interior 14 to remain a party to the active voice call 500A. Alternatively, the active voice call 500A may be transferred to the mobile device 50, followed by disconnection of the in-vehicle channel. That is, the active voice call 500A absent the present teachings typically progresses as a hands-free voice conversation through existing cellular telephone capabilities of the VTU 18. The selective transmission of the active voice call 500A to the mobile device 50 as contemplated herein thus occurs seamlessly, such that active voice call 500A is uninterrupted as the operator 40 exits the vehicle interior 14 and walks away from the motor vehicle 10.

For example, an exemplary use scenario is depicted in FIG. 3 in which the operator 40 is speaking on the mobile device 50, in this instance a smartphone, during a roadside maintenance situation. Ordinarily, the established active voice call 500A of FIG. 1 would be routed to one or more audio speakers 31 situated within the vehicle interior 14, with speech from the operator 40 detected by one or more microphones 23 likewise arranged within the vehicle interior 14. Solely for illustrative simplicity, a single microphone 23 and audio speaker 31 are shown in FIG. 2, with the present teachings contemplating the use of an array of microphones 23 and several audio speakers 31, as appreciated in the art.

To enable the call transfer functions of the present disclosure, the motor vehicle 10 of FIG. 1 is equipped with a control system (C) 16 configured to selectively offload or transfer the active voice call 500A to the mobile device 50. The transferred call is represented in FIG. 1 as active voice call 500B for clarity, and may be concurrent with the active voice call 500A in some embodiments. The transfer occurs when an operator 40 of the motor vehicle 10 exits the vehicle interior 14, as represented in FIG. 3, after the active voice call 500A is first established with the call center 11 in the typical manner, i.e., while the operator 40 is seated within the vehicle interior 14.

The present solutions are enabled by a vehicle telematics unit (VTU) 18, an electronic control unit (ECU) 20 having resident memory (M) 22 and a processor (P) 24, and a sensor suite (S) 26. As part of the described programmed functionality of the control system 16, including performance of a method 100 as described below with reference to FIG. 4, the control system 16 of FIG. 1 is equipped with a global positioning system (GPS) receiver 30 and a cellular antenna 32, along with shorter range Bluetooth®, NFC, low-frequency, or Wi-Fi receivers included as part of the constituent hardware of the VTU 18, ECU 20, and/or sensor suite 26.

As appreciated in the art of vehicular telematics, equipment commonly associated with the VTU 18 may be equipped with a vehicle communication interface module 21, one or more unidirectional or multidirectional microphones 23 located in the vehicle interior 14, and a call button 25 typically located on a rear-view mirror, center stack, or other readily accessible location. The motor vehicle 10 in performing the method 100 is configured to communicate with the call center 11 on an as-needed or an as-requested basis during a roadside event requiring the services of the call center 11, including but not limited to an accident, breakdown, inclement weather, lost driver situation, component failure, etc.

In response to detection by the sensor suite 26 of the event, or at the request of an operator of the motor vehicle 10, e.g., via a push button request via the call button 25, the control system 16 coordinates the active voice call 500A with the call center 11. The active voice call 500A may be established via cell towers 27 as indicated by double-headed arrow AA, and/or via a constellation of communication satellites 28 (double-headed arrow BB). In turn, the cell towers 27 and/or the satellites 28 connect to a receiver 29 of the call center 11, with the operator 40 of the motor vehicle 10 and a human adviser (not shown) of the call center 11 thereafter engaging in conversation over the established connection, as appreciated in the art.

The ECU 20 of FIG. 1 for its part may be embodied as one or more digital computer devices equipped with respective memory (M) 22 and one or more corresponding processors (P) 24. Although omitted for clarity and illustrative simplicity, the ECU 20 is also equipped with a timer or clock operable for time-stamping events, such that the ECU 20 is aware of the time and date of collection of transmitted or received data, including relevant sensor data 260 from the sensor suite 26. Algorithms, software, control logic, protocols, and/or methods disclosed hereinbelow, including the representative method 100 of FIG. 4, may be embodied at least in part as computer-executable software stored in the memory 22, e.g., a tangible non-transitory computer-readable storage medium such as flash memory, solid-state drive (SSD) memory, hard-disk drive (HDD) memory, CD-ROM, digital versatile disk (DVD), or other suitable memory devices. Likewise, the ECU 20 may be equipped with an embedded voice-processing unit utilizing audio filtering, editing, and analysis modules.

Operation of the processor 24 may entail the use of an application specific integrated circuit (ASIC), a programmable logic device (PLD), a field programmable logic device (FPLD), discrete logic, etc. Thus, instructions embodying the exemplary method 100 of FIG. 4 as described below, or alternative embodiments thereof, may be recorded on non-transitory, computer-readable storage medium, with such a medium or media represented for simplicity in FIG. 1 as the memory 22. Execution of the instructions by the processor 24 causes the ECU 20 to perform the various functions described herein, with the processor 24 likewise performing functions requested by the VTU 18 as needed. The ECU 20 is additionally configured to receive a call transfer approval signal 200 as part of its programmed functionality, as described in detail below with particular reference to FIG. 4.

Figure 4:
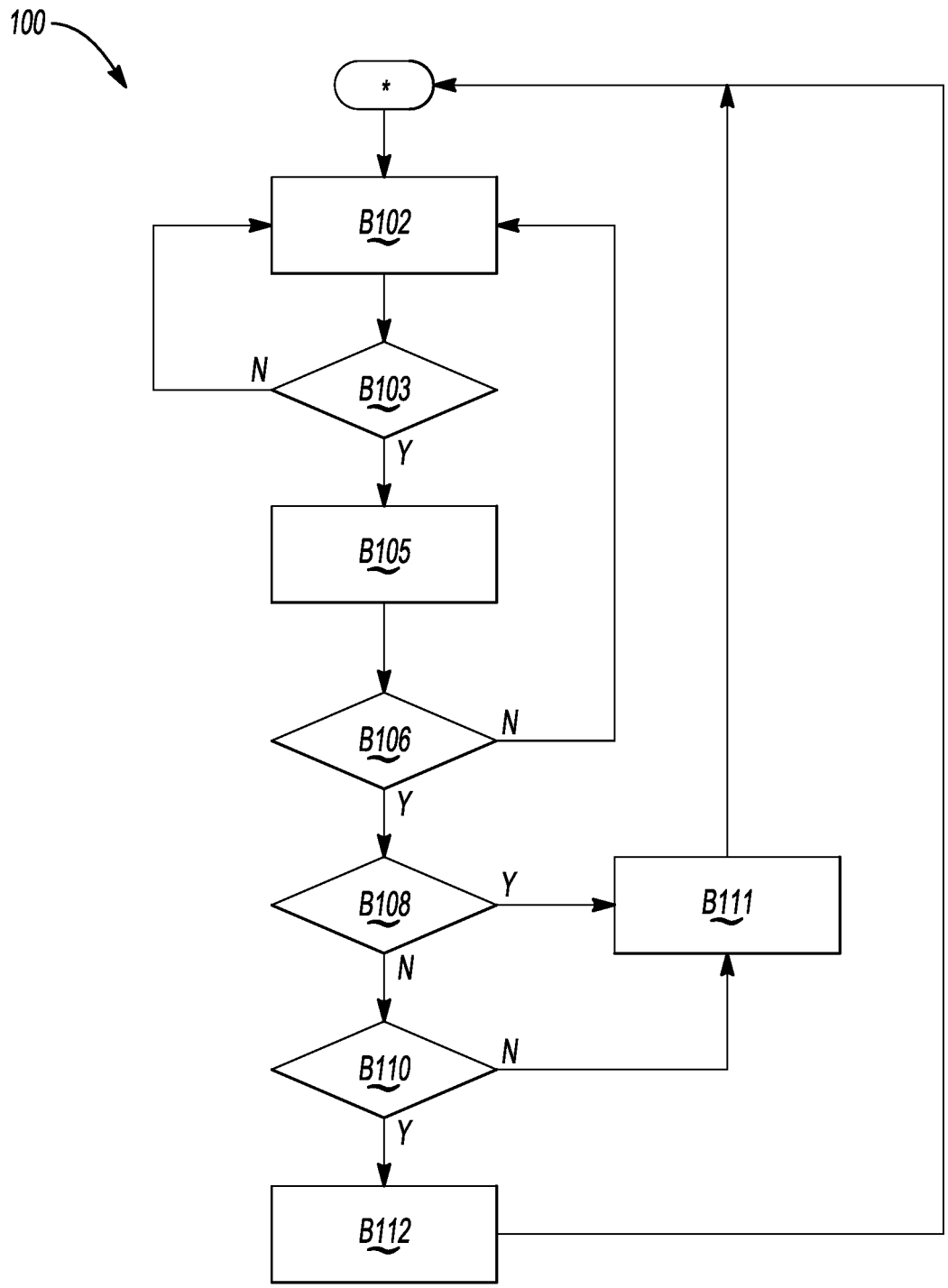
FIG. 4 is a flow chart showing a representative embodiment of the present method.

Referring now to FIG. 4, an exemplary embodiment of the method 100 for use aboard the motor vehicle 10 of FIG. 1 or another similarly equipped variation thereof includes detecting, using the ECU 20, an active voice call between the VTU 18 and the remote call center 11. The method 100 may include processing the sensor data 260 from the sensor suite 26 via the ECU 20, with the sensor data 260 being indicative of the operator 40 of the motor vehicle 10 having exited the vehicle interior 14 as shown in FIG. 3.

In response to the enabling conditions, the VTU 18 transfers the active voice to the portable electronic device 50 of FIG. 2, which is located external to the vehicle interior 14, with the enabling conditions including receipt by the ECU 20 of the call transfer approval signal 200, e.g., a prerecorded approval setting or "opt-in" recorded in memory of/accessible by the ECU, or a confirmation signal entered in real-time in response to a prompt from the call center 11 or the control system 16. Such embodiments enable automatic or manual confirmation of call transfer approvals.

Referring to FIG. 4, a method 100 for use aboard the motor vehicle 10 of FIG. 1 or other similarly equipped variations thereof includes detecting, using the ECU 20 of the motor vehicle 10, an active voice call 500A between the VTU 18 and the remote call center 11. The method 100 also includes processing the sensor data 260 via the ECU 20, with the sensor data 260 being indicative of the operator 40 of the motor vehicle 10 having exited the vehicle interior 14. In response to one or more enabling conditions, the method 100 includes transferring the active voice 500A to the mobile device 50 located external to the vehicle interior 14, as best shown in FIG. 3, with the enabling condition(s) possibly including receipt by the ECU 20 of FIG. 1 of the call transfer approval signal 200.

An embodiment of the method 100 commences with initiation (*) of the VTU 18 and the ECU 20 of FIG. 1 at the onset of a drive cycle, i.e., when the operator 40 of FIGS. 2 and 3 starts the motor vehicle 10. The constituent sensors of the sensor suite 26 depicted in FIG. 1 are likewise initialized, such that the associated hardware and software used to implement the method 100 is collectively online and ready to commence processing functions. The method 100 proceeds to block B102.

At block B102, the ECU 20 of FIG. 1 detects or otherwise confirms that the active voice call 500A is active, e.g., by verifying the transmit/receive state of the VTU 18. The method 100 then proceeds to block B103.

At block B103, the ECU 20 next determines whether the operator 40 of FIGS. 2 and 3 has initiated a call transfer, i.e., a request indicative of a desire to offload or transfer the active voice call 500A of FIG. 1 to the mobile device 50. Digital signal processing functions may be performed by the ECU 20 for this purpose, including processing an electronic signal from the mobile device 50 indicative of a real-time request, or verifying that the operator 40 previously recorded a default call transfer preference, e.g., in memory 22 or in another storage medium accessible by the processor 24. The method 100 repeats block B102 if the call transfer has not been initiated. The method 100 proceeds in the alternative to block B105 when the operator 40 has not requested a call transfer.

Block B105 of FIG. 4 includes transferring the active voice call 500A of FIG. 1 to the mobile device 50 in response to the recorded preference or real-time confirming action taken by the operator 40 at block B103. The method 100 then proceeds to block B106.

Block B106 includes determining whether the operator 40 of FIGS. 2 and 3 has exited the vehicle interior 14. To this end, the ECU 20 may process an electronic signal indicative of a present location of the mobile device 50, with block B106 entailing comparing the present location of the mobile device 50 to a present location of the motor vehicle 10. For instance, as appreciated in the art a modern smartphone is typically equipped with a GPS-capable mobile chipset, shown at 52, such that the present location of the mobile device 50 is available. The electronic signal indicative of the present location of the mobile device 50 may therefore include the GPS position reported by the mobile device 50.

Alternatively or concurrently, the ECU 20 shown in FIG. 1 may process the sensor data 260 of FIG. 1 by detecting an unpairing or disconnection of a wired or wireless connection of the mobile device 50 and the VTU 18, with unpairing thereafter treated by the VTU 18 as being indicative of the operator 40 having left the vehicle interior 14. Detection of an RF key fob having left the vehicle interior 14 is yet another possible indicator. In yet another possible implementation of block B106, the sensor data 260 may include one or more occupancy signals indicative of a presence of the operator 40 within the vehicle interior 14, possibly detected in different manners depending on the hardware hosted by the motor vehicle 10. Non-limiting representative implementations include a seatbelt latch state signal or a door open/closed state signal, which taken together may inform the ECU 20 of the likelihood that the operator 40 has unlatched her seatbelt and opened a door of the motor vehicle 10. Weight sensors may be embedded in one or more vehicle seats, or the vehicle interior 14 may be equipped with infrared sensors, ultrasound sensors, motion detectors, etc., with data from one or more of the possible sensor types of the sensor suite 26 shown in FIG. 1 used by the ECU 20 to determine whether the operator 40 remains present within the vehicle interior 14. The method 100 returns to block B102 when the operator 40 has not left the vehicle interior 14, with the method 100 otherwise proceeding to block B108.

Block B108, which is arrived at when the ECU 20 has detected that the operator 40 has exited the vehicle interior 14, includes determining whether the operator 40 presently requests or previously opted in to automatic call transfer functions of the ECU 20. The method 100 proceeds to block B111 if the operator 40 has opted in or requested the call transfer, and to block B110 in the alternative if the operator 40 has not yet done so.

At block B110, the call center 11 may prompt the operator 40, via interaction with the VTU 18, to confirm whether the active voice call 500A should be transferred to the mobile device 50, or the active voice call 500A should be concurrently supported or simultaneously broadcast by the VTU 18 as an in-vehicle call. Such a prompt may be in the form of a displayed digital image, e.g., a graphic and/or text. The method 100 proceeds to block B111 when the operator 40 confirms that the active voice call 500A of FIG. 1 should be transferred to the mobile device 50, with the ECU 20 disconnecting the active voice call 500A after establishing the active voice call 500B, and to block B112 in the alternative when the operator 40 requests that transfer of the active voice call 500A to the mobile device 50 without disconnecting the active voice call 500A.

Block B111 includes transferring the active voice call 500A to the mobile device 50, with the ECU 20 thereafter ending the active voice call 500A. A passenger remaining within the vehicle interior 14 would no longer be able to hear or participate in conversation with the call center 11 of FIG. 1, with the active voice call 500B being the sole active call. The method 100 is then finished, resuming with the initiation (*) block. Should the operator 40 return to the vehicle interior 14, the ECU 20 is able to resume the active voice call 500A in a hands-free manner, effectively terminating the active voice call 500B.

Block B112 includes mirroring the active voice call 500A within the vehicle interior 14 and on the mobile device 50. That is, a passenger remaining within the vehicle interior 14 is able to participate in the active voice call 500A in an uninterrupted manner while the same conversation transpires via the mobile device 50 as active voice call 500B. By way of an illustrative example, an adviser working on behalf of the call center 11 would be able to simultaneously carry on a conversation with the operator on the mobile device 50 and one or more passengers seated within the vehicle interior 14, in the manner of a conference call. The call center 11 may also elect to use multiple advisers, with one adviser handling the active voice call 500A and another handling active voice call 500B. Such an option may be useful in certain situations in which information provided to the operator 40 differ from those seated within the vehicle interior 14. Thus, the conversational content of the active voice calls 500A and 500B may be exactly the same or different as the situation warrants.

As will be appreciated by those skilled in the art in view of the foregoing disclosure, the present teachings enable auto-initiated or adviser-initiated transfers of established telephonic voice calls to occur in the context of in-vehicle active voice calls 500A to or from the call center 11 shown in FIG. 1. Remotely controlled audio transfers to a secondary device, exemplified herein as the mobile device 50 of FIG. 3, occur without the need for the operator 40 to act, outside of possible recording of a default transfer preference or a simple touch response to a displayed digital prompt, e.g., on the mobile device 50 or a similar in-vehicle touch screen.

As one of the enabled options, the operator 40 may opt for concurrent audio communications channels, i.e., between the call center 11 and the motor vehicle 10, and between the call center 11 and the mobile device 50 located apart from the motor vehicle 10. If the mobile device 50 should happen to unpair or disconnect from motor vehicle 10, e.g., due to customer leaving the vehicle interior 14 or the motor vehicle 10 losing power, the adviser may call the mobile device 50, e.g., using the last available MSISDN from the motor vehicle 10 as appreciated in the art. The present teachings thus allow the operator 40 to continue with the active voice call 500B while outside of the motor vehicle 10 regardless of the status of the originally established active voice call 500A. These and other benefits will be readily appreciated by those skilled in the art in view of the forgoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for use aboard a motor vehicle having a vehicle interior and a vehicle telematics unit (VTU), comprising:
   detecting, using an electronic control unit (ECU) of the motor vehicle, an active voice call between the VTU and a call center located remotely from the motor vehicle;
   processing sensor data, via the ECU, indicative of an operator of the motor vehicle having exited the vehicle interior; and
   in response to one or more enabling conditions, transferring the active voice call to a mobile device situated outside of the vehicle interior such that the active voice call is uninterrupted as the operator exits the vehicle interior and walks away from the motor vehicle, the one or more enabling conditions including receipt by the ECU of a call transfer approval signal.

2. The method of claim 1, wherein the call transfer approval signal includes a prerecorded approval setting in memory of the ECU or accessible thereby, such that the active voice call is automatically transferred to the mobile device when the mobile device is situated outside of the vehicle interior.

3. The method of claim 1, further comprising transmitting a prompt to the mobile device, and using an affirmative reply to the prompt as the call transfer approval signal.

4. The method of claim 3, wherein transmitting the prompt to the mobile device includes transmitting a digital image to the mobile device for display on a touchscreen thereof.

5. The method of claim 1, wherein processing the sensor data comprises:
   processing an electronic signal indicative of a present location of the mobile device; and
   comparing the present location of the mobile device to a present location of the motor vehicle.

6. The method of claim 5, wherein the mobile device includes a global positioning system (GPS) receiver or chipset operable for determining a GPS position of the mobile device, and wherein the electronic signal indicative of the present location of the mobile device includes the GPS position of the mobile device.

7. The method of claim 1, wherein the motor vehicle includes an audio speaker located within the vehicle interior, the method further comprising:
   broadcasting the active voice call via the audio speaker concurrently with transferring the active voice call to the mobile device, such that the active voice call is simultaneously audible on the audio speaker and the mobile device over concurrent communications channels.

8. The method of claim 1, wherein processing the sensor data includes detecting an unpairing or disconnection of a wired or wireless connection of the mobile device and the VTU.

9. The method of claim 1, wherein processing the sensor data includes processing one or more occupancy signals indicative of a presence of the operator within the vehicle interior.

10. The method of claim 1, wherein transferring the active voice call to the mobile device includes initiating, via the ECU, a cellular phone connection between the call center and the mobile device.

11. The method of claim 1, wherein the sensor suite includes one or more occupancy sensors each configured to generate an occupancy signal indicative of a presence of the operator within the vehicle interior.

12. A motor vehicle comprising:
   a vehicle body defining a vehicle interior; and
   a control system comprising:
      a vehicle telematics unit (VTU);
      a sensor suite; and
      an electronic control unit (ECU) configured to:
         detect an active voice call between the VTU and a call center located remotely from the motor vehicle;
         process sensor data from the sensor suite, the sensor data being indicative of an operator of the motor vehicle having exited the vehicle interior; and
         transfer the active voice call to a mobile device located external to the vehicle interior in response to one or more enabling conditions such that the active voice call is uninterrupted as the operator exits the vehicle interior and walks away from the motor vehicle, the enabling conditions including receipt by the ECU of a call transfer approval signal.

13. The motor vehicle of claim 12, wherein the call transfer approval signal includes a prerecorded approval setting in memory of the ECU or accessible thereby, such that the active voice call is automatically transferred to the mobile device when the mobile device is situated outside of the vehicle interior.

14. The motor vehicle of claim 12, wherein the ECU is configured to receive the call transfer approval signal from the mobile device as an affirmative reply by the operator to a prompt displayed via the mobile device.

15. The motor vehicle of claim 14, wherein the ECU is configured to transmit the prompt to the mobile device as a digital image.

16. The motor vehicle of claim 12, wherein the VTU is configured to determine a present location of the motor vehicle, and wherein the ECU is configured to process the sensor data by:
   processing an electronic signal indicative of a present location of the mobile device; and
   compare the present location of the mobile device to the present location of the motor vehicle.

17. The motor vehicle of claim 16, wherein the mobile device includes a global positioning system (GPS) receiver or chipset operable for determining a GPS position of the mobile device, and wherein the electronic signal indicative of the present location of the mobile device includes the GPS position of the mobile device.

18. The motor vehicle of claim 12, further comprising an audio speaker located within the vehicle interior, wherein the ECU is configured for simulcasting the active voice call via the audio speaker and the mobile device, such that the active voice call is simultaneously audible on the audio speaker and the mobile device over concurrent communications channels.

19. The motor vehicle of claim 12, wherein the ECU is configured to detect an unpairing or disconnection of a wired or wireless connection of the mobile device and the VTU as an indicator of the operator of the motor vehicle having exited the vehicle interior.

20. A computer-readable storage medium on which is recorded instructions, wherein execution of the instructions by a processor of an electronic control unit (ECU) of a motor vehicle having a vehicle interior causes the processor to:

detect an active voice call between a vehicle telematics unit (VTU) of the motor vehicle and a call center located remotely from the motor vehicle;

process sensor data indicative of an operator of the motor vehicle having exited the vehicle interior; and in response to one or more enabling conditions, transfer the active voice call to a mobile device located external to the vehicle interior, without terminating the active voice call within the vehicle interior, such that the active voice call is uninterrupted as the operator exits the vehicle interior and walks away from the motor vehicle, the one or more enabling conditions including receipt by the ECU of a call transfer approval signal.

* * * * *